(12) United States Patent
Zhu et al.

(10) Patent No.: US 8,472,331 B2
(45) Date of Patent: Jun. 25, 2013

(54) TECHNIQUES FOR COEXISTENCE-AWARE RESOURCE ALLOCATION IN WIRELESS NETWORKS

(75) Inventors: Jing Zhu, Hillsboro, OR (US); Xue Yang, Portland, OR (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 11/845,004

(22) Filed: Aug. 24, 2007

(65) Prior Publication Data

US 2009/0003303 A1 Jan. 1, 2009

Related U.S. Application Data

(60) Provisional application No. 60/943,501, filed on Jun. 12, 2007.

(51) Int. Cl.
| | |
|---|---|
| H04W 4/00 | (2009.01) |
| H04W 72/00 | (2009.01) |
| H04W 80/00 | (2009.01) |
| H04L 12/26 | (2006.01) |
| H04B 7/00 | (2006.01) |
| H04B 17/00 | (2006.01) |

(52) U.S. Cl.
USPC ........... 370/252; 370/329; 370/336; 370/345; 455/450; 455/509; 455/556.1

(58) Field of Classification Search
USPC ................ 370/311, 458, 229, 252, 329, 336, 370/345; 455/560, 556.1, 435.2, 450, 509
See application file for complete search history.

(56) References Cited

U.S. PATENT DOCUMENTS

| | | | |
|---|---|---|---|
| 7,567,543 B2 * | 7/2009 | Cao et al. ...................... 370/338 |
| 7,620,370 B2 * | 11/2009 | Barak et al. ................ 455/67.13 |
| 7,626,931 B2 * | 12/2009 | Wu et al. ....................... 370/232 |
| 7,864,701 B2 * | 1/2011 | Matusz ......................... 370/254 |
| 7,929,432 B2 * | 4/2011 | Zhu et al. ...................... 370/229 |
| 2006/0291430 A1 * | 12/2006 | Putzolu et al. ................ 370/335 |
| 2007/0066314 A1 * | 3/2007 | Sherman et al. .............. 455/445 |
| 2007/0071026 A1 * | 3/2007 | Rogers .......................... 370/458 |
| 2007/0071114 A1 * | 3/2007 | Sanderford et al. .......... 375/259 |
| 2007/0135162 A1 * | 6/2007 | Banerjea et al. ........... 455/556.1 |
| 2007/0232358 A1 * | 10/2007 | Sherman ....................... 455/560 |
| 2007/0237075 A1 * | 10/2007 | Chen et al. .................... 370/229 |
| 2007/0275746 A1 * | 11/2007 | Bitran ........................... 455/509 |
| 2008/0051085 A1 * | 2/2008 | Ganton ...................... 455/435.2 |
| 2008/0139212 A1 * | 6/2008 | Chen et al. .................... 455/450 |
| 2008/0298287 A1 * | 12/2008 | Martinez-Perez et al. .... 370/311 |
| 2008/0298524 A1 * | 12/2008 | Koorapaty et al. ........... 375/348 |
| 2010/0118829 A1 * | 5/2010 | Lin et al. ....................... 370/330 |

* cited by examiner

*Primary Examiner* — Alpus H Hsu
(74) *Attorney, Agent, or Firm* — Thorpe North & Western, LLP

(57) ABSTRACT

An embodiment of the present invention provides a method, comprising using MAC coordination between a plurality of co-located radios to resolve co-located multi-radio co-existence at the MAC layer.

17 Claims, 4 Drawing Sheets

TECHNIQUES FOR COEXISTENCE-AWARE RESOURCE ALLOCATION IN WIRELESS NETWORKS

CROSS-REFERENCE TO RELATED APPLICATIONS

This U.S. application claims priority to pending application U.S. provisional application No. 60/943,501, filed Jun. 12, 2007, entitled "Techniques for Coexistence-Aware Resource Allocation in Wireless Networks".

BACKGROUND

Increasingly, computing or communication devices, such as laptops, handhelds, cell phones, etc., are being equipped with multiple radios, e.g., Bluetooth, WiFi, and WiMAX radios, namely MRD (multi-radio device). Although spectrum has been carefully allocated to wireless technologies to avoid overlap and prevent interference, simultaneous operation of multiple radios collocated on the same physical device is still a challenging task given small form-factor and limited isolation (<25 dB). Also, mobile devices are getting smaller and smaller, while the number of radios integrated keeps increasing. It is thus desirable to share components among radios, e.g. RF front end and antennas, cutting cost and reducing size.

Thus, a strong need exists for techniques for coexistence-aware resource allocation in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
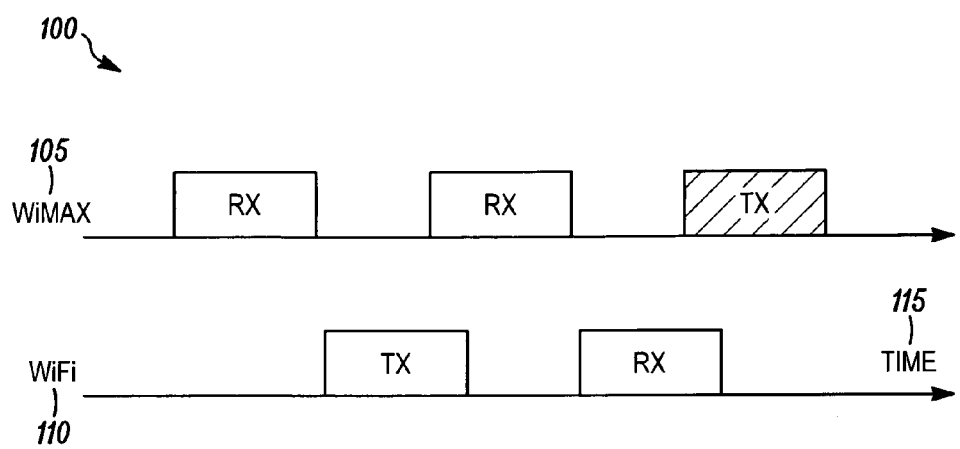
FIG. 1 illustrates a time sharing operation of WiFi and WiMAX radios on a multi-radio device (MRD) in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

A common practice to support simultaneous operations of multiple radios in a shared environment (due to interference or HW resource conflict) is time-sharing, i.e. interleaving radio activities (TX or RX) in time domain. FIG. 1 at 100 illustrates how a WiMAX radio 105 may coexist with a WiFi radio 110 by time sharing 115.

Figure 2A:
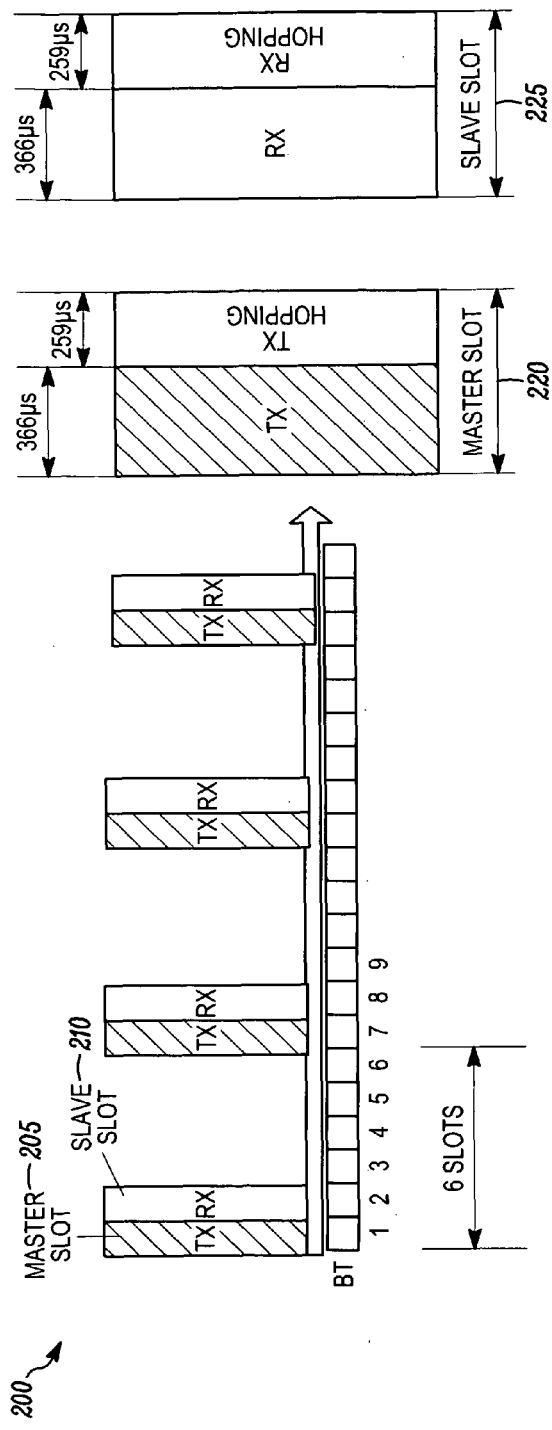
FIGS. 2a and 2b show radio activities in accordance with an embodiment of the present invention.
Figure 2B:
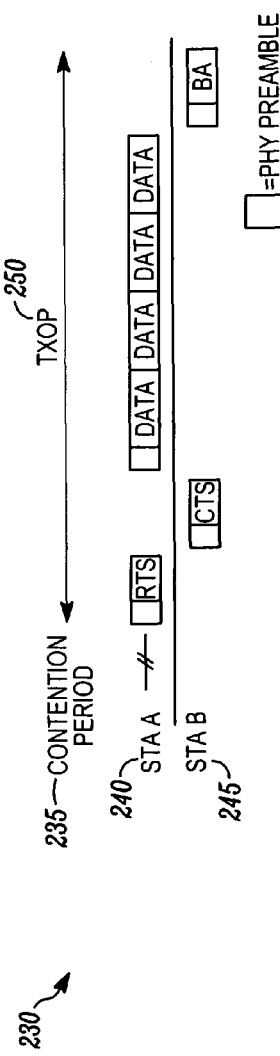

Although not limited in this respect, time domain radio activities may be defined by inter-arrival time and duration, with two models: random and periodic. In a random model, inter-arrival time is a random variable, and therefore it is hard to predict when the next activity will occur, for example, WiFi activity. In a periodic model, such as BT HV3 link, inter-arrival time may have a certain pattern, and the pattern may be recurring. FIG. 2, generally at 200, shows the examples periodic (2a) and random (2b) radio activities of some embodiments of the present invention. Periodic may include master 205, 220 (e.g., WiMAX) and slave 210, 225 (e.g., WiFi) time slots. Random may include station A 240 and station B 245 with contention period 235 and TXOP 250.

Although not limited in this respect, embodiments of the present invention provide a novel algorithm to better support the time sharing operations of a WiMAX radio with other radio activities, including random, periodic, or both activities. In particular, an embodiment of the present invention addresses the following issues:

Mobile Station feeds back to Base Station the timing information of its collocated periodic radio activities to allow the Base Station to do its best to avoid conflicting durations.

Mobile Station obtains timing information of its own WiMAX RX or TX activities to minimize its required active time, which helps to leave more time for other collocated radios to operate.

TABLE 1 today's DCD burst profile

| Name | Type | Length | Value |
|---|---|---|---|
| CID_In_DL_IE | 169 | 1 | 0 = CID does not appear in DL-MAP IE (default) 1 = CID does appear in DL-MAP IE 2-255 = Reserved |

Table 1 set forth above provides a DCD burst profile. WiMAX activities can be both random and periodic, depending on the type of connection.

Figure 3:
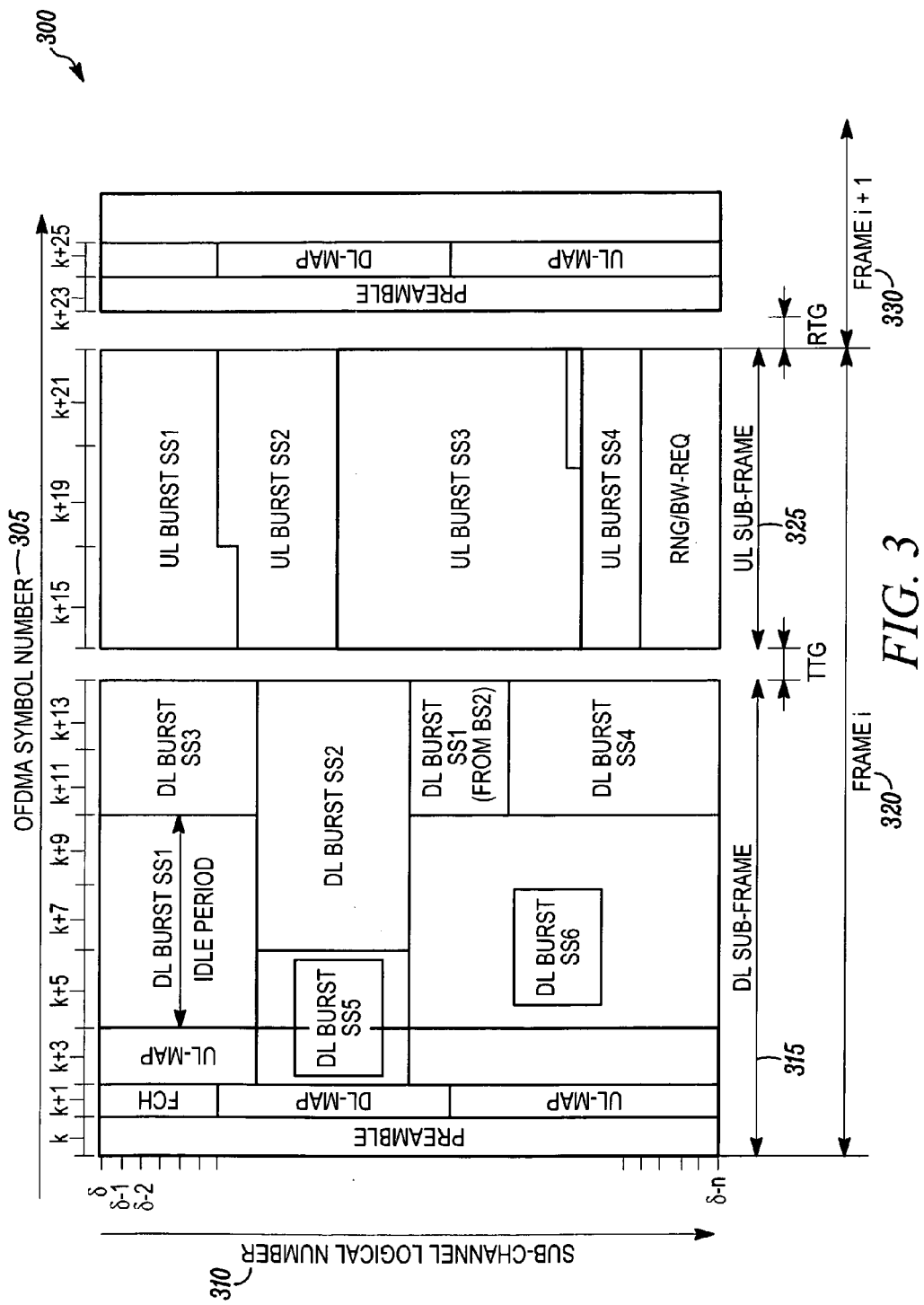
FIG. 3 illustrates a WiMAX Frame Structure in accordance with embodiments of the present invention.

Turning now to FIG. 3 at 300 is an illustration depicting a WiMAX frame format. A frame may be divided into two sub-frames, one for downlink 315, and the other for uplink 325. At the very beginning is preamble, followed by FCH, DL-MAP, and UL-MAP. CID is the identification for a connection. UL-MAP always carries CID and its allocation information, so that a MS will know when and where to transmit. DL-MAP may also carry such information, called "CID in DL-MAP". Allowing "CID in DL-MAP" benefits the Time Sharing (TS) operations between multiple radios. The reason is because a mobile WiMAX station (MS) will know whether and where to receive its own information in the DL sub-frame at the very beginning of the frame, and the rest idle period may be used for other collocated radio's activities. As a result, the total throughput across multiple radios at the MRD can be increased. The drawback of "CID in DL-MAP" may be that it may introduce additionally control overhead to the system, and thus should be turned on only when it is necessary. OFDM symbol number is shown at 305 with frame i illustrated as 320 and frame i+1 at 325 and sub-channel logical number at 310.

Figure 4:
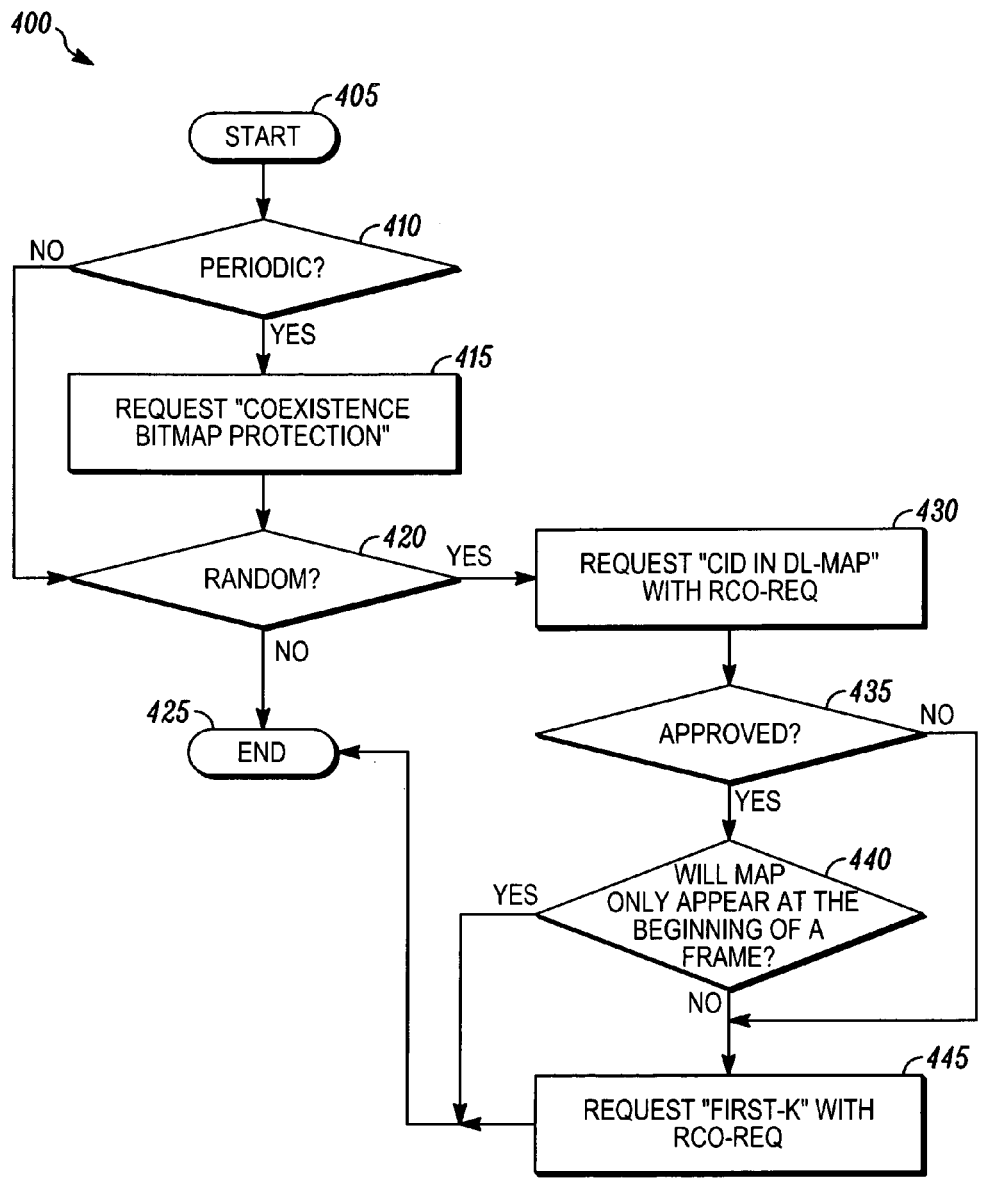
FIG. 4 is a flow chart for MS-based coexistence-aware allocation request algorithms in accordance with embodiments of the present invention.

Although the present invention is not limited in this respect, FIG. 4 at 400 depicts the flow chart of the proposed coexistence aware allocation request algorithm of an embodiment of the present invention. Once the TS operation is triggered at 405, the WiMAX MS at MRD will decide whether other collocated radio's activities are periodic or random at 410. If it is determined to be periodic, the MS will send a "Coexistence Bitmap Protection" request to BS at 415, asking to avoid being scheduled at a set of bad spots, and the BS will respond with the estimated hit rate, which can be used by the MS how to conduct the TS operation. If the other radio's activities are random 420, the MS will request "CID in DL-MAP" 430. At 445, the "First K allocation" request will be sent out if either the "CID in DL-MAP" request is not approved (determined at 435), or DL-MAP is not limited to the beginning of the frame (determined at 440). The process ends at 425.

The following explains details of the three requests of some embodiments of the present invention.

1) Coexistence Bitmap Protection (CBP): An embodiment of the present invention provides using a bitmap to mark the time intervals that are not good for TX or RX based on the MS's local knowledge. The time granularity of the bitmap reference may be controllable, and the minimum is one WiMAX symbol (i.e. 102.9us). Notice that only the coexistence bitmap protection for unicast DL/UL grants should be used because broadcast or multicast traffic are i) usually sent with much less load and longer interval compared to unicast traffic, and therefore their impact on the TS operation is relatively insignificant; and ii) much more difficult for BS to change the scheduling of broadcast/multicast messages such as PHY preamble, DL-MAP, and UL-MAP, etc. Thus, it should not be counted as "hit" if a broadcast or multicast frame is allocated in a bad spot. Next, is described the message exchange to support this technique. Table 2 shows TLV (Type-Length-Value) coding for the two messages that are proposed for this technique: CBP-REQ and CBP-RSP.

TABLE 2

TLV coding for CBP-REQ and CBP-RSP

| Type | Length | Value | Scope |
|---|---|---|---|
| Downlink | Varied (>1 byte) | Byte 1:<br>Bit 1: Bitmap Indicator<br>Bit 2-8: Bitmap unit<br>(in unit of symbol)<br>Byte 2: FSN (Frame Sequence Number) of<br>starting of the allocation<br>Byte 3: length of bitmap<br>(in unit of bit)<br>After: bitmap | CBP-REQ |
| Uplink | Fixed (1 byte) | Bit 1: Bitmap Indicator<br>Bit 3-5: DL Hit Rate<br>Bit 6-8: UL Hit Rate | CBP-RSP |

The field in CBP-REQ is provided as follows:
Byte1:bit1=1: Bitmap is attached.
Byte1:bit1=0: Bitmap is NOT attached (meaning all slots are "good")
The rest bits in the CBP-REQ is meaningful only if "Byte1: bit2=1", and we have
"Byte 1:Bit2-8": the granularity of the bitmap reference in the unit of symbol
"Byte2": the FSN (Frame Sequence Number) of the starting frame for the bitmap
"Byte3": the length of bitmap (in terms of bits), up to 254 bits
"After Byte3" gives the actual bitmap allocation (0: good; 1: bad)
The CBP-RSP message is designed for the BS to respond to the CB-REQ message, and we have Bit1=1: CBP is allowed
Bit1=0: CBP is not allowed
The rest bits (Bit 2-8) is meaningful only if "bit1=1". The present invention may further divide it into two subfields with 3 bits each. They are used to provide the current status of coexistence bitmap protection at the BS. DL and UL are considered separately. The coding for the values of Hit Rate is shown in Table 5.6. Hit rate is defined as $$r_i = \frac{b_i}{a_i}$$

where $a_i$ indicates the number of bad spots (in terms of symbols) requested for protection in the bitmap from MS i, and $b_i$ indicates the number of bad spots that are expected to hit (in average) in the actual allocation, measured by BS.

TABLE 3 the values of Hit Rate

| | |
|---|---|
| 000 | 0~12.5% |
| 001 | 12.5%~25% |
| 010 | 25%~37.5% |
| 011 | 37.5%~50% |
| 100 | 50%~62.5% |
| 101 | 62.5%~75% |
| 110 | 75%~87.5% |
| 111 | 87.5%~100% |

For definition and/or activation of the coexistence bitmap protection, the MS shall send CBP-REQ with "Byte1: Bit2=1" along with the bitmap; the BS shall respond with CBP-RS. The MS may retransmit CB-REQ message if it does not receive the CB-RSP message within a timer (T1). In the response, the BS may indicate that the coexistence bitmap protection is not allowed. After receiving the CB-RSP with "Bit 2=0", the MS should wait for the minimum time (T2) before sending out its next CB-REQ with "Byte1:Bit 2=1", and the timer shall be restarted at each time of receiving the CB-RSP with "Bit 2=0". The BS may send out the unsolicited CB-RSP message with "Bit 2=0" using broadcast CID to deactivate the coexistence bitmap protection for the entire cell, or using basic CID to deactivate a specific MS.

TABLE 4

Example values of the related Timer

| | |
|---|---|
| T1 | 100 ms |
| T2 | 20 sec |

2) CID in DL-MAP: As shown above, "CID_In_DL_IE" is specified in the DCD burst profile, so that all connections using the same burst profile share the same value. This adds control overhead to put CID in the DL-MAP. However, "CID in DL-MAP" is desirable for the random TS operation, because it reduces the required active time for the WiMAX radio, and allows more time for other radios' activities.

To achieve the trade-off between MAP overhead and coexistence support, an embodiment of the present invention makes "CID in DL-MAP" specific to each individual MS. In other words, it will be turned on for the MS that has explicitly requested, and only when the added MAP overhead does not impact the system performance (for example the system is far from being saturated). The BS may terminate the "CID in DL-MAP" operation anytime when it is necessary. Hereby, we add a new option (denoted as "2" below) to the "CID_In_DL_IE" field to indicate that the "CID in DL-MAP" is enabled for all connections of a particular MS (identified with basic CID) ONLY when the MS sends an explicit request with its basic CID the BS acknowledges the request and agrees to turn it on for the MS.

Thus, MSs using the same burst profile may have different configurations. Once the BS approves the request, it shall send back the information to indicate when the "CID in DL-MAP" operation will start. Also, all the broadcast and multicast traffics relevant to the MS will be automatically enabled with "CID in DL-MAP". If not doing so, the MS still does not know where broadcast and multicast information are, and needs to receive the whole DL sub-frame. After the request is rejected, the MS has to wait for a minimal interval (T2) before it can start another request.

3) First-K Allocation: Consider the following two scenarios: 1) CID not in DL-MAP; 2) DL-MAP throughout the frame. It is necessary to reduce the unnecessary RX activities of the WiMAX radio on the downlink. Thus, an embodiment of the present invention provides a First-K Allocation (FKA) mechanism where the MS may send an FKA request to the BS, and the BS shall respond with a K value, indicating:

If the MS did not receive any relevant information in the first K symbols of a frame, there shall be no any relevant information of the MS in the rest of the frame.

The K value is determined by the BS, and
K=0 means that the operation is disabled
K>0 means that if there is relevant information in a frame for the MS, including unicast, broadcast, or multicast DL bursts or the schedule for UL bursts, one of such information shall be allocated within the first K symbols of the frame. The MS may decide to receive all the DL symbols after detecting its relevant information within the first K symbols.

For definition and/or activation of "CID in DL-MAP" or "First-K Allocation", the MS shall send RCO-REQ (Random COexistence); the BS shall respond with RCO-RSP. The MS may retransmit RCO-REQ message if it does not receive the RCO-RSP message within a timer (T1). In the response, the BS shall indicate what operation it will activate, and when. Particularly, if FKA is activated, the BS shall also specify the K value. If the indicator in the RCO-RSP is "0", it means that the corresponding activity is deactivated, the MS shall wait for the minimum time (T2) before sending out its next RCO-REQ with that indicator turned on, and the timer shall be restarted at each time of receiving the RCO-RSP with "0". The BS may send unsolicited RCO-RSP using broadcast, multicast, or unicast CID to change any indicator and their relevant configurations, such as the K value. The MS shall respect the last values that are sent with any CID (broadcast, multicast, or unicast) to which the MS is relevant to. Table 5 below provides the aforementioned TLV coding for RCO-REQ and RCO-RSP

TABLE 5

TLV coding for RCO-REQ and RCO-RSP

| Type | Length | Value | Scope |
|---|---|---|---|
| Downlink | Fixed (1 byte) | Bit 1: "CID in DL-MAP" Indicator<br>Bit 2: "First-K Allocation" Indicator<br>Bit 3-8: Reserved | RCO-REQ |
| Uplink | Various (> or = 1 byte) | Byte 1:<br>Bit 1: "CID in DL-MAP" Indicator<br>Bit 2: "First-K Allocation" Indicator<br>Bit 3-8: Reserved<br>If "Bit 1 or 2 > 0"<br>Byte 2: FSN of starting of the allocation<br>If "Bit 2 = 1", then<br>Byte 3: the K value (up to $2^8$ symbols) | RCO-RSP |

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a mobile station having a plurality of time domain radios configured for media access control (MAC) coordination to resolve co-located multi-radio co-existence at a MAC layer;
wherein one of said plurality of radios is a Worldwide Interoperability for Microwave Access (WIMAX) radio and said MAC coordination supports time sharing operations of said WIMAX radio with other co-located radio activities, including determining if an inter-arrival time of communications sent by at least one other co-located radio in the plurality of radios to a base station is one of periodic and random,
wherein the WIMAX radio communicates to the base station at least one of:
a coexistence bitmap protection request when at least one inter-arrival time of the at least one other co-located radio is periodic, the coexistence bitmap request indicating the at least one inter-arrival time, and
a connection identification (CID) downlink (DL) multiple access protocol (MAP) request to enable coexistence aware allocation between at least two radios in said plurality of radios when the at least one inter-arrival time of the at least one other co-located radio is random, wherein said WIMAX radio uses a WIMAX frame format divided into two sub-frames, one for DL and the other for uplink (UL), and wherein said DL includes a Downlink-Multiple Access Protocol (DL-MAP) which carries a CID in the DL-MAP, allowing both time sharing (TS) operations between the at least two radios by enabling said MS to know whether and where to receive its own information in the DL sub-frame at the very beginning of the frame using the CID and to take a rest idle period.

2. The apparatus of claim 1, wherein said apparatus comprises the mobile station (MS) having the plurality of radios, wherein the plurality of radios includes the WIMAX radio which feeds back to the base station (BS) the timing information of its collocated periodic radio activities to allow the base station to reduce conflicting durations with the MS collocated periodic radio activities.

3. The apparatus of claim 2, wherein said MS obtains timing information of WIMAX Receive (RX) or Transmit (TX) activities at the MS to minimize a required active time by said MS enabling more time for other collocated radios to operate.

4. The apparatus of claim 2, wherein said MS uses Coexistence Bitmap Protection which provides using a bitmap to mark the time intervals that are not good for at least one of Transmit TX and Receive RX based on said MS's local knowledge without acquiring information from the base station.

5. The apparatus of claim 1, wherein said CID in the DL-MAP activates the TS operations between the multiple radios only when necessary to reduce system control overhead.

6. The apparatus of claim 1, wherein said MS uses a CID _ In_DL_IE field to indicate that said CID in DL-MAP is enabled for all connections of a particular MS only when said MS sends an explicit request with its basic CID and the BS acknowledges the request and agrees to turn it on for said MS.

7. The apparatus of claim 1, wherein said MS provides a First-K Allocation (FKA) mechanism where said MS may send an FKA request to said BS, and the BS responds with a defined number indicating that if the MS did not receive any relevant information in the defined number of symbols of a frame, there shall be no relevant information of the MS in the rest of the frame enabling more time for other collocated radios to operate.

8. A method, comprising:
using media access control (MAC) coordination between a plurality of co-located radios to resolve co-located multi-radio co-existence at a MAC layer;
wherein one of said plurality of co-located radios is a Worldwide Interoperability for Microwave Access (WIMAX) radio and said MAC coordination supports time sharing operations of said WIMAX radio with other co-located radio activities, including determining if
an inter-arrival time of said other co-located radio activities is one of periodic and random;
wherein a mobile station includes at least two of the plurality of radios, including the WIMAX radio, communicating to a base station at least one of:
  a coexistence bitmap protection request when the inter-arrival time of the other co-located radio activities is periodic, the coexistence bitmap request indicating the inter-arrival time, and
  a connection identification (CID) downlink (DL) multiple access protocol (MAP) request to enable coexistence aware allocation between the at least two radios in said plurality of radios when the inter-arrival time of the other co-located radio activities is random, wherein said WIMAX radio uses a WIMAX frame format divided into two sub-frames, one for DL and the other for uplink (UL), and wherein said DL includes a Downlink-Multiple Access Protocol (DL-MAP) which carries a CID in the DL-MAP, allowing time sharing (TS) operations between the at least two radios by enabling said MS to know whether and where to receive its own information in the DL sub-frame at the very beginning of the frame using the CID and to take a rest idle period.

9. The method of claim 8, further comprising feeding back timing information of its collocated periodic radio activities to the base station (BS) from the mobile station (MS) comprising the plurality of radios, wherein the plurality of radios includes the WIMAX radio to allow the Base Station to reduce conflicting durations with the MS collocated periodic radio activities.

10. The method of claim 9, further comprising obtaining timing information of WIMAX Receive (RX) or Transmit (TX) activities by said MS to minimize its required active time thereby enabling more time for other collocated radios to operate.

11. The method of claim 9, further comprising using by said MS Coexistence Bitmap Protection which provides using a bitmap to mark the time intervals that are not good for at least one of Transmit (TX) and Receive (RX) based on said MS's local knowledge without acquiring information from the base station.

12. The method of claim 8, further comprising activating the TS operations between the multiple radios using said CID in DL-MAP only when necessary to reduce system control overhead.

13. The method of claim 8, further comprising using by said MS a CID_In_DL_IE field to indicate that said CID in DL-MAP is enabled for all connections of a particular MS only when said MS sends an explicit request with its basic CID and the BS acknowledges the request and agrees to turn it on for said MS.

14. The method of claim 8, further comprising providing by said MS a First-K Allocation (FKA) mechanism wherein said ms may send an FKA request to said BS, and the BS responds with a defined numberindicating that if the MS did not receive any relevant information in the defined number of symbols of a frame, there shall be not any relevant information of the MS in the rest of the frame, enabling more time for other collocated radios to operate.

15. A non-transitory computer-readable medium that provides instructions, which when accessed, cause a machine to perform operations comprising:
  using media access control (MAC) coordination between a plurality of co-located radios to resolve co-located multi-radio co-existence at a MAC layer.
  wherein one of said plurality of radios is a Worldwide Interoperability for Microwave Access (WIMAX) radio and said MAC coordination supports time sharing operations of said WIMAX radio with other co-located radio activities, including determining if an inter-arrival time of said other co-located radio activities is one of periodic and random,
  wherein the WIMAX radio, which is configured to communicate to a base station at least one of:
    coexistence bitmap protection request when the inter-arrival time of the other co-located radio activities is periodic, the coexistence bitmap request indicating the inter-arrival time, and
    a connection identification (CID) downlink (DL) multiple access protocol (MAP) request to enable coexistence aware allocation between the at least two radios in said plurality of radios when the inter-arrival time of the other co-located radio activities is random, wherein said WIMAX radio uses a WIMAX frame format divided into two sub-frames, one for DL and the other for uplink (UL), and wherein said DL includes a Downlink-Multiple Access Protocol (DL-MAP) which carries a CID in the DL-MAP, allowing time sharing (TS) operations between the at least two radios by enabling said MS to know whether and where to receive its own information in the DL sub-frame at the very beginning of the frame using the CID and to take a rest idle period.

16. The non-transitory computer-readable medium of claim 15, further comprising said instructions causing said machine to perform operations further comprising using feeding back timing information of its collocated periodic radio activities to the base station (BS) from the mobile station (MS) comprising the plurality of radios, wherein the plurality of radios includes the WIMAX radio to allow the base station to reduce conflicting durations with the MS collocated periodic radio activities.

17. The non-transitory computer-readable medium of claim 16, further comprising said instructions causing said machine to perform operations further comprising using obtaining timing information of WIMAX Receive (RX) or Transmit (TX) activities by said MS to minimize its required active time thereby enabling more time for other collocated radios to operate.

* * * * *